(12) United States Patent
Mehl

(10) Patent No.: US 7,997,597 B2
(45) Date of Patent: Aug. 16, 2011

(54) SITTING ORTHOPEDIC MOBILITY SCOOTER

(76) Inventor: John Timothy Mehl, Chalfont, PA (US)

( * ) Notice: Subject to any disclaimer, the term of this patent is extended or adjusted under 35 U.S.C. 154(b) by 279 days.

(21) Appl. No.: 12/352,566

(22) Filed: Jan. 12, 2009

(65) Prior Publication Data
US 2009/0179399 A1   Jul. 16, 2009

Related U.S. Application Data

(60) Provisional application No. 61/021,010, filed on Jan. 14, 2008.

(51) Int. Cl.
*B62M 1/00* (2010.01)
(52) U.S. Cl. ............ 280/87.021; 280/639; 280/47.38
(58) Field of Classification Search .......... 280/639, 280/647, 657, 87.01, 87.021, 87.041, 87.05, 280/87.051, 47.38, 47.4
See application file for complete search history.

(56) References Cited

U.S. PATENT DOCUMENTS

| | | | |
|---|---|---|---|
| 2,530,544 A * | 11/1950 | Schwantes | ............... 280/87.051 |
| 3,488,088 A | 1/1970 | Goldberg | |
| 3,992,024 A | 11/1976 | Workman | |
| 4,065,145 A | 12/1977 | Chambers | |
| 4,239,248 A | 12/1980 | Ewers | |
| 4,861,051 A | 8/1989 | Napper | |
| 5,158,313 A | 10/1992 | Becker | |
| 5,167,597 A | 12/1992 | David | |
| 5,411,035 A * | 5/1995 | Stone | ............................ 128/845 |
| D363,904 S | 11/1995 | Stone | |
| 5,741,020 A | 4/1998 | Harroun | |
| D396,833 S | 8/1998 | Eidt et al. | |
| 5,839,740 A | 11/1998 | Seeger | |
| 5,904,398 A * | 5/1999 | Farricielli | ..................... 297/313 |
| 6,053,189 A | 4/2000 | Longenecker | |
| 6,149,170 A | 11/2000 | Dotson | |
| 6,161,860 A | 12/2000 | Corneau | |
| 6,848,696 B2 | 2/2005 | Miller | |
| 6,851,498 B1 * | 2/2005 | Sauve | ........................... 180/208 |
| 6,866,109 B2 * | 3/2005 | Roach | ........................... 180/65.1 |
| D517,455 S | 3/2006 | Allen | |
| 7,287,767 B1 | 10/2007 | Gomes et al. | |
| 7,311,319 B1 | 12/2007 | Ortega | |
| 7,431,391 B2 * | 10/2008 | Hsiao | ....................... 297/215.15 |
| 7,780,180 B2 * | 8/2010 | Hoepner et al. | .............. 280/267 |
| 2006/0244231 A1 * | 11/2006 | Rogers | ..................... 280/87.051 |
| 2007/0283990 A1 * | 12/2007 | Fernandez et al. | .............. 135/67 |

* cited by examiner

*Primary Examiner* — John D Walters

(57) ABSTRACT

An orthopedic mobility scooter for persons with a compromised leg or foot comprising a frame for supporting the weight of an occupant in a sitting position and a leg rest for supporting the compromised leg. The healthy leg is used to propel the scooter with an unobstructed stride. Wheels are located at the front and rear of the frame. Handles attached to a steering column and connected to a front wheel control the direction of travel. A padded seat is positioned near the center of the frame. A horizontal rod extending perpendicular to the frame is used to connect a leg rest and a stabilizing front wheel. The front horizontal rod and rear axle can both be positioned to either side of the frame to accommodate either a left or right compromised leg or foot. The scooter has enough clearance and stability to surmount obstacles such as street curbs.

4 Claims, 6 Drawing Sheets

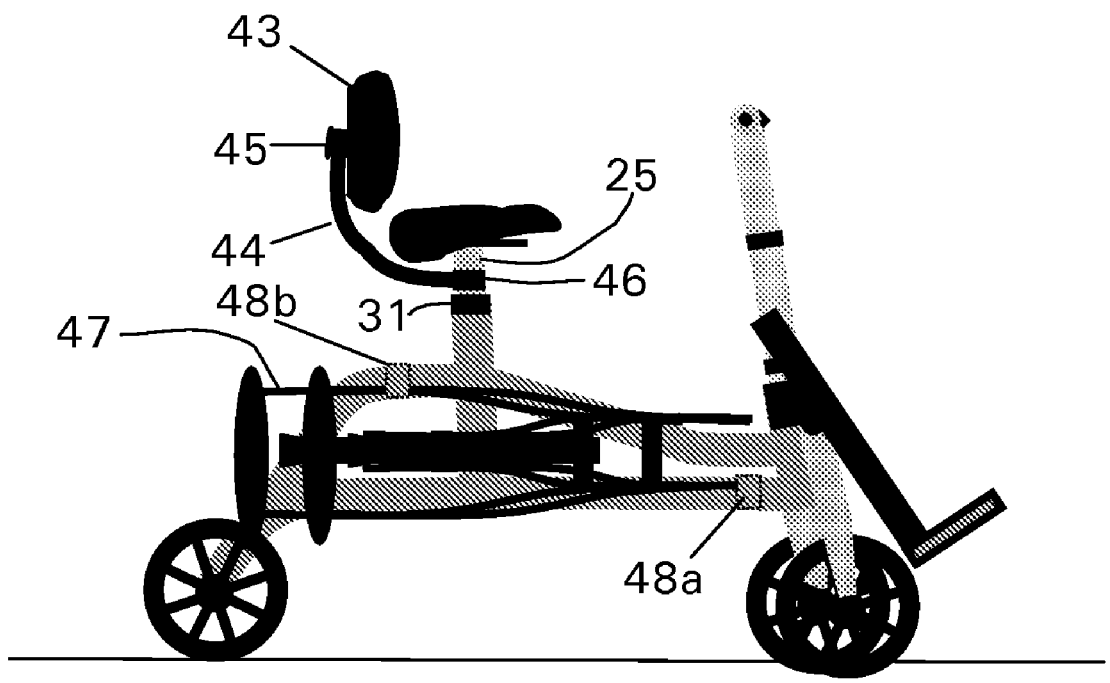

SITTING ORTHOPEDIC MOBILITY SCOOTER

CROSS-REFERENCE TO RELATED APPLICATIONS

Figure 1:
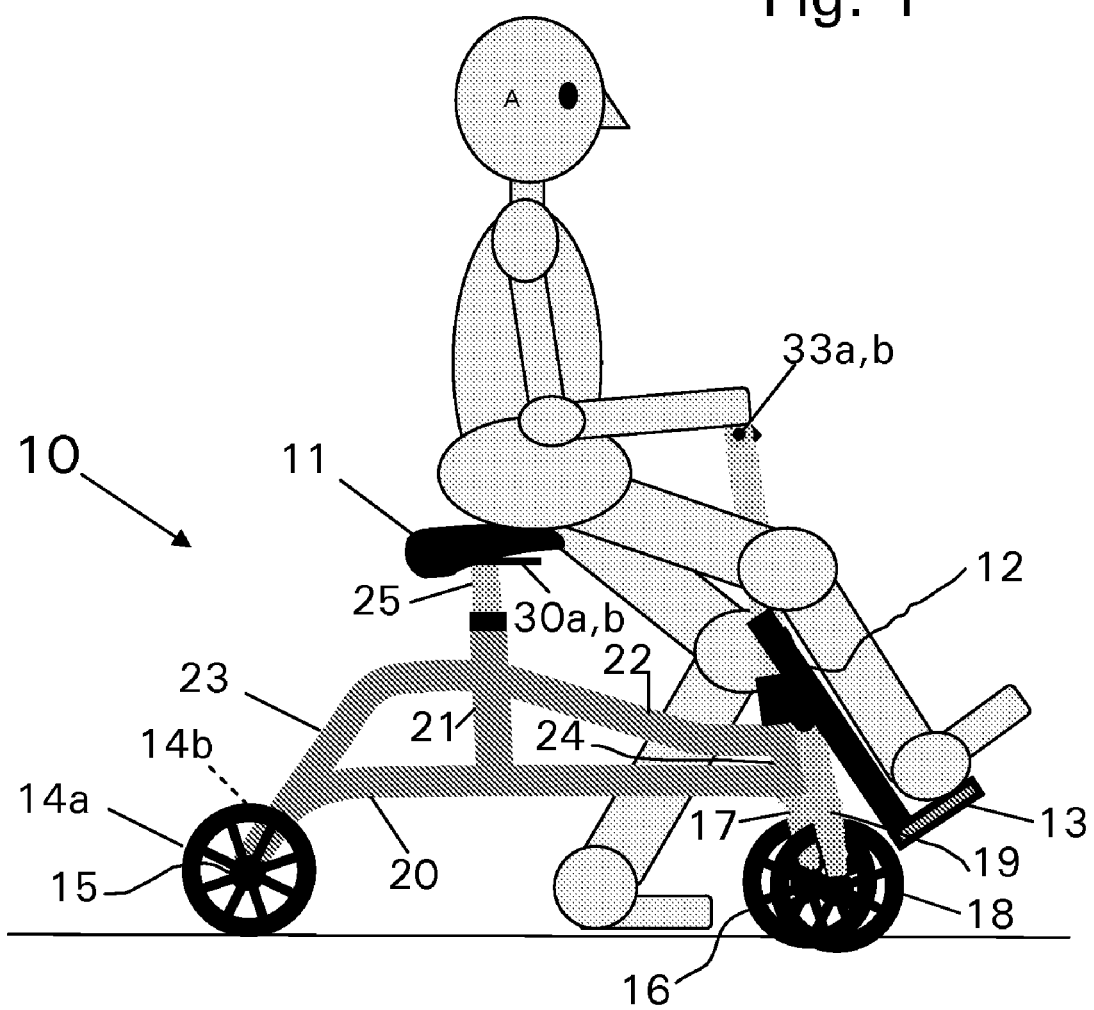

The present application is based upon U.S. Provisional Patent Application No. 61/021,010 filed Jan. 14, 2008 entitled Sitting Orthopedic Scooter.

BACKGROUND OF THE INVENTION

1. Field of the Invention

The present invention relates to mobility walker, scooter, and caddie devices for assisting those with a compromised leg or foot. In particular, this invention pertains to a sitting mobility device that can support a compromised leg in a comfortable safe position while the device is propelled using the healthy leg.

2. Description of the Prior Art

Walker-type devices with the means to allow the occupant to sit have been described in the following U.S. Pat. Nos.: 3,488,088; 3,992,024; 4,065,145; 4,239,248; 4,861,051; 5,158,313; 5,167,597; 5,741,020; D396,833; 6,149,170; and 6,161,860. Though each of these devices enable a person with a compromised leg or foot to transport themselves across relatively flat and even surfaces, e.g., school hallways, none of the devices, with exception of U.S. Pat. No. 6,161,860 by Corneau, have a mechanical means for supporting an injured leg or foot. The occupant would be required to support the weight of their compromised leg themselves. The walker described in U.S. Pat. No. 6,161,860 has a foot rest however, the intended design is to support the legs only while an attendant is pushing the walker. The foot rest is not designed to be used while the occupant is self-propelling the walker. The walkers listed above are limited by an inability to clear obstacles such as a street curb. Only the devices described in patents U.S. Pat. No. 4,239,248 by Evers; U.S. Pat. No. 5,158,313 by Becher, and U.S. Pat. No. D396,833 by Eidt and Tamison are designed with enough clearance to navigate the device up or down a street curb. However, as described above, these three inventions do not provide support of an injured leg or foot. Three patents in particular: U.S. Pat. Nos. 4,065,145; 6,149,170; 6,161,860 have notable similarity to the present invention (Sitting Orthopedic Mobility Scooter) however, the inventions described in these patents do not allow the occupant to take optimal advantage of the full strength and stride of the healthy leg used to propel the scooter. This is due to either obstruction by the rear axle, as in U.S. Pat. No. 4,065,145, or obstruction by the front axle and/or foot rest in U.S. Pat. Nos. 6,149,170 and 6,161,860.

Kneeling-type orthopedic leg support scooters have also been described. U.S. Pat. Nos.: D363,904; 5,839,740; 6,053,189; 6,848,696; D517,455; 7,287,767; and 7,311,319 describe variations of a orthopedic wheeled leg support scooter. Each is propelled by a healthy leg, while the injured leg rests on a kneeling pad. Though each design has a unique set of distinguishing features, none of the scooters are designed to be propelled while the occupant is in a sitting position. Further, none of these orthopedic scooters are suitable for leg injuries at or above the knee. These scooters are only suitable for injuries to the foot or below the knee.

BRIEF SUMMARY OF INVENTION

The goal of the present invention is to provide a lightweight, affordable, and compact sitting scooter device that enables an occupant to transport themselves to the various places required for modern urban and suburban living. The device provides full support of a compromised leg or foot and is not limited to injuries or impairments located below the knee. The device can be used to safely navigate street curbs, ramps, and doorways. The invention is designed to fit within buses, trains, and some airplanes. The device can be used on sidewalks, street surfaces, on grass, inside schools, office buildings, airports, stores, and shopping centers. The invention can be used inside the house, within the kitchen, bathroom, and bedroom. The device is collapsible for convenient stowage inside car trunks or backseats and storage in closets.

The scooter is asymmetric in design and is configured for either a left or right compromised leg or foot. The asymmetrical design allows for full unobstructed stride of the healthy leg used to propel the scooter. The configuration of the scooter is fully interchangeable between left or right configuration without the need for additional components.

The scooter is adjustable to fit occupants of varying size. The seat height can be raised or lowered and the seat can be moved rearward or forward. The leg rest can be raised or lowered and positioned to a full range of angles. Wheel locks are provided to prevent movement of the scooter during mounting and dismounting. Hand activated brake levers located on the handle bar are used by the occupant to slow or stop the scooter.

The direction of the scooter is controlled by rotation of the handle bar that is attached to the front primary wheel. A secondary front wheel, or wheels, is attached to a swivel mounted fork. The role of the secondary front wheel is to stabilize the scooter. The secondary front wheel moves in parallel to the primary front wheel and the direction of the secondary front wheel is dictated by the direction of the primary front wheel. The scooter can be controlled using only one hand. This allows use of the free hand for grasping and holding objects such as a coffee cup or a door knob. The later is important when the scooter occupant must go through a swinging door.

In short, the device of the present invention enables an occupant with a compromised leg or foot and a healthy leg to transport and maneuver themselves to the wide variety of locations required for modern living, all the while in a safe and comfortable sitting position with full support of the compromised leg or foot.

BRIEF DESCRIPTION OF THE SEVERAL VIEWS OF THE DRAWLING

FIG. 1 is a side view of a four-wheeled orthopedic scooter. The scooter is configured for an occupant with a compromised right leg. In this configuration the left leg is used to propel the scooter. Only one rear wheel is visible from this perspective.

Figure 2:
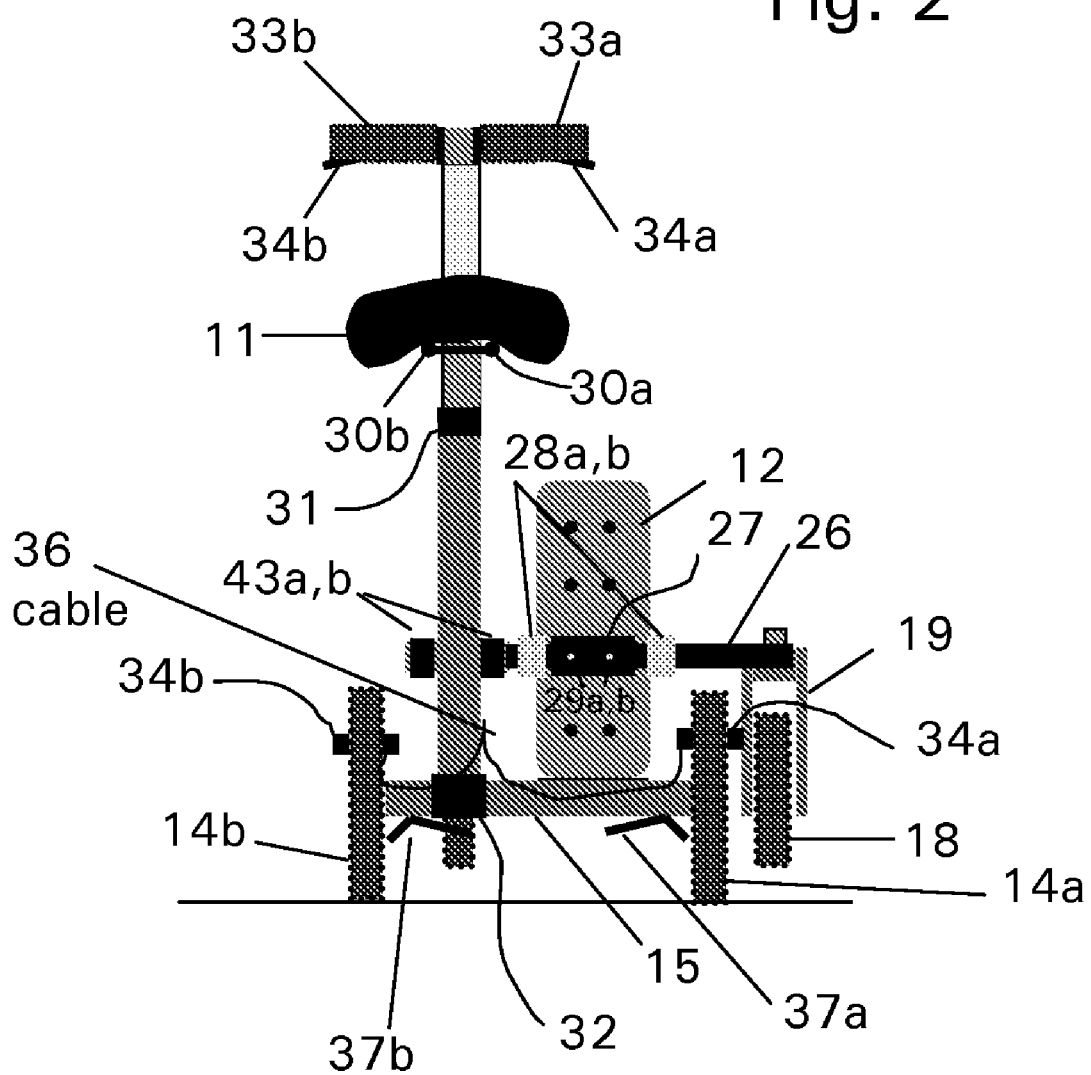

FIG. 2 is a rear view of the scooter configured for a compromised right leg. The rear axle is positioned fully biased to the right side of the scooter. The leg rest pad is positioned on the right side of the scooter to support the compromised leg.

Figure 3:
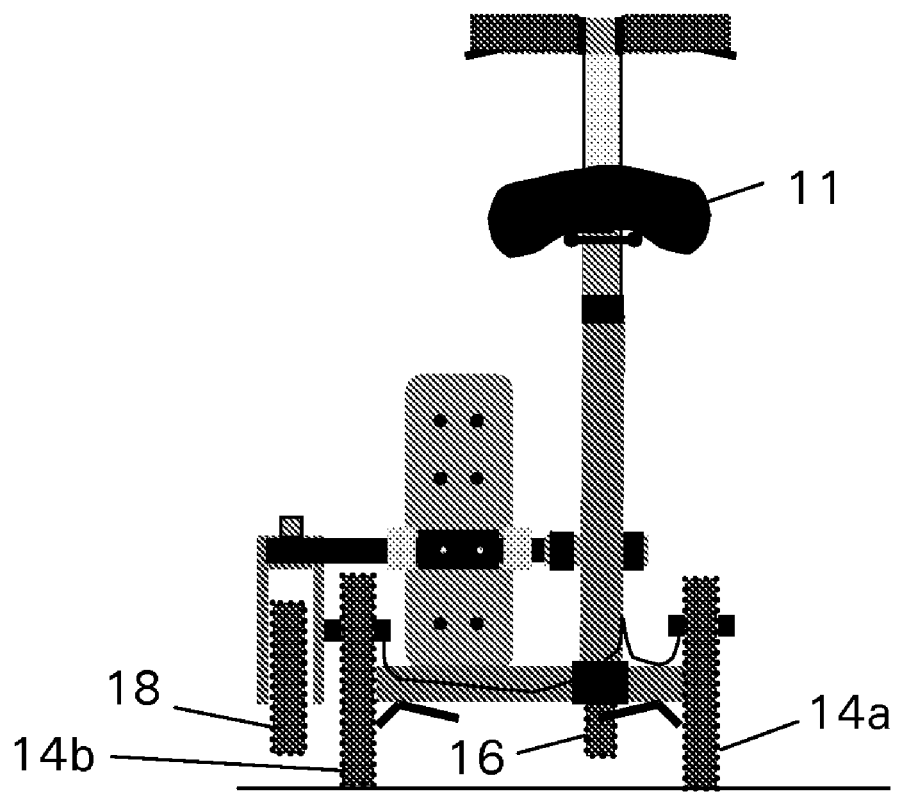

FIG. 3 is a rear view of the scooter configured for a compromised left leg. The rear axle is positioned fully biased to the left side of the scooter. The leg rest pad is positioned on the left side of the scooter to support the compromised leg.

Figure 4:
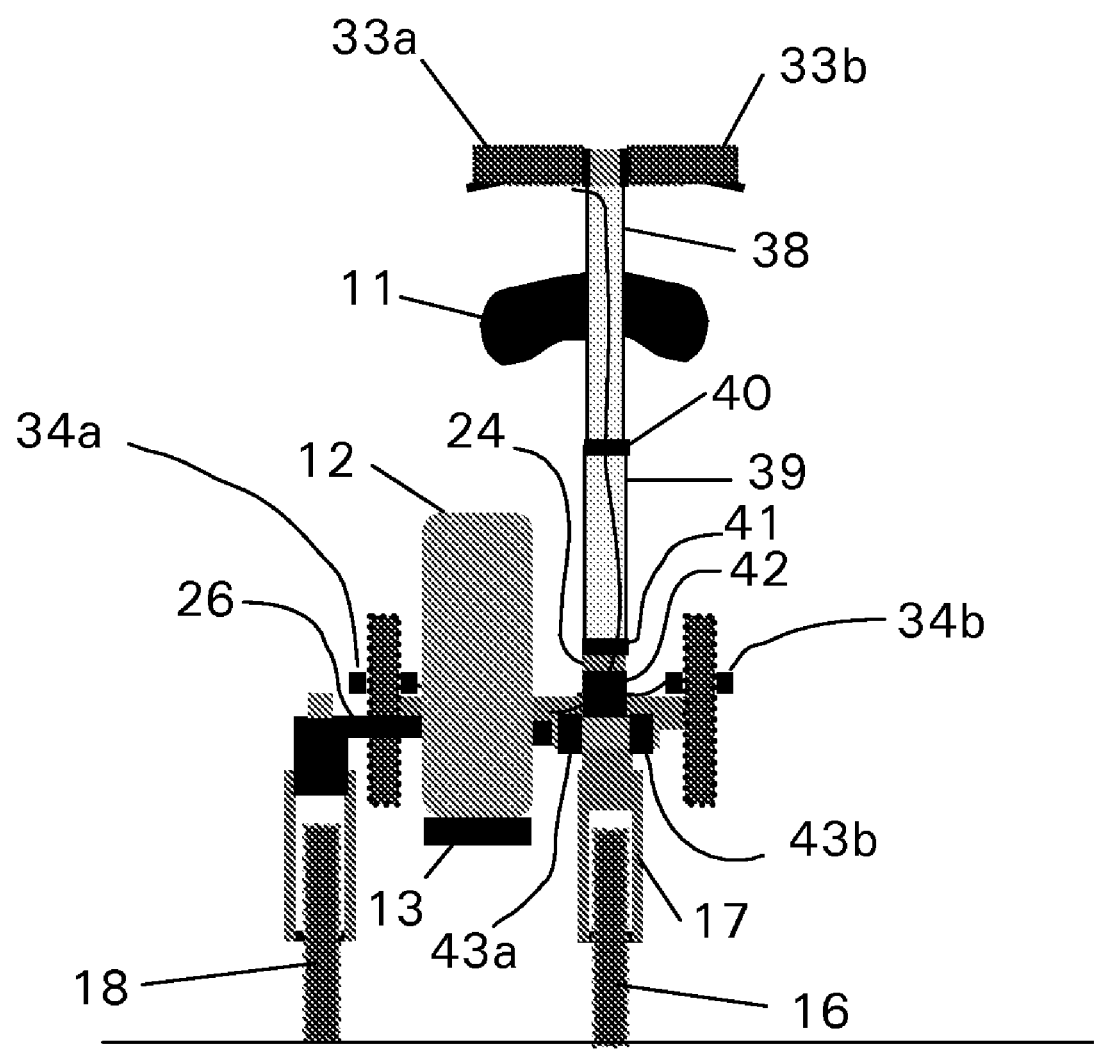

FIG. 4 is a frontal view of the scooter configured for a compromised right leg. The handle bar is height adjustable by means a telescopic arrangement of concentric tubes. Brake levers on the handles activate calipers located on the rear wheels.

Figure 5:
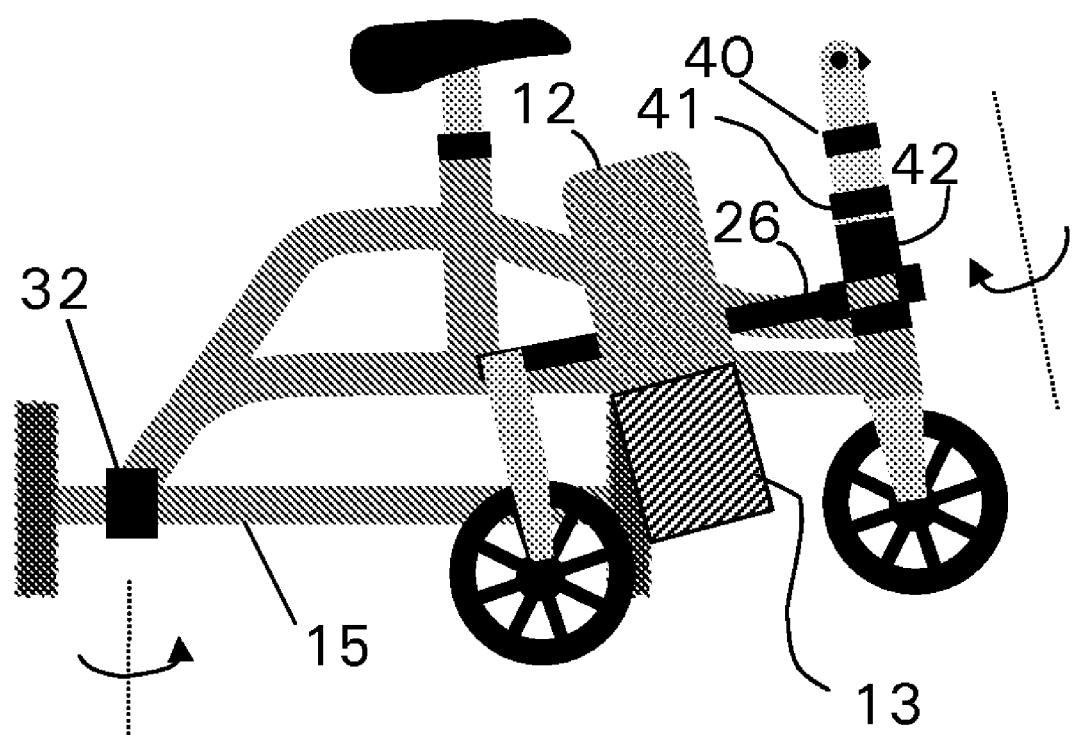

FIG. 5 is a side view showing the scooter is a collapsed configuration. The front leg rest and secondary front wheel are folded back to the scooter frame. The foot rest is folded upward. The rear axle is folded forward into the scooter frame. The handles are lowered by collapsing the telescopic steering column.

FIG. 6 is a side view showing the scooter with optional crutches and an optional back rest. The height of the back rest can be adjusted to optimize the comfort of the occupant. The crutches are of a folding design and are secured to the scooter using brackets. Crutches may be necessary when an obstacle such as a flight of stairs is encountered. The occupant would use the crutches in a conventional manner while an assistant carries the lightweight scooter.

DETAILED DESCRIPTION OF THE INVENTION

The present invention comprises a wheeled scooter designed for individuals requiring assistance with walking. The unique aspects of the present invention include, but are not limited to, inclusion of a padded seat to support the weight of a person in a sitting position and a padded surface to support a compromised leg, as well as the ability of the scooter to be configured for either a compromised left leg or right leg, and the ability to propel the scooter using the healthy leg. Unlike the devices of the prior art, the present invention overcomes the problem of being limited to injuries below the knee by providing a means for the occupant to remain in a sitting position while propelling the scooter and by providing full support of a compromised leg. The device overcomes the limitation of the prior art of not being suitable for navigating up or down street curbs by providing a design with high vertical clearance and low center of gravity to maintain stability. The prior art also limits the effective stride of the healthy propelling leg and the present invention is designed asymmetrically to overcome this problem.

In one general embodiment of the present invention, the scooter comprises tubular frame capable of supporting the weight of an occupant. A handle bar is used to steer the scooter and there is a padded leg support that extends past the front of the scooter. The scooter also contains two rear wheels, a front steering wheel mounted to a steering column, and a front stabilizing wheel mounted to a freely rotating fork. The leg support and front stabilizing wheel are both mounted to a rod that can be moved to either side of the scooter frame depending upon which leg is compromised. The rear axle can be positioned in a fully biased position to either the left side or right side of the scooter, depending upon which leg is compromised. The handle bar also comprises hand controlled brake levers that activate brake calipers on the rear wheels. The scooter is stable, compact, sturdy, lightweight, and collapsible.

In one preferred embodiment, the present invention comprises a four-wheeled scooter designed for an individual with a compromised leg. Referring now to the drawings, in particular to FIG. 1, the occupant, Person A, shown with a compromised right leg, is seated on padded seat 11 of scooter 10. Person A is also referred to as the occupant. The compromised leg rests on padded surface 12. The foot is additionally supported by heal rest 13. The healthy leg (left leg in FIG. 1) makes contact with the ground and is used to propel the scooter. The scooter contains two rear wheels 14a and 14b, both attached to rear axle 15. Only one of the rear wheels is visible from the side view of FIG. 1. A front wheel 16, referred to as the "primary front wheel" is mounted to front fork 17. The primary front wheel is used to steer the scooter. Another front wheel 18, referred to as the "secondary front wheel" is mounted to a freely swiveling front fork 19. The secondary front wheel is used to stabilize the scooter.

The scooter frame is comprised of five tubular members rigidly attached together. The first frame member 20 extends along the lower portion of the scooter from the rear of the scooter to the front of the scooter in an upward arching manner. The second frame member 21 extends vertically upward from the first frame member to the seat post 25. The third frame member 22 extends forward from near the top of the second frame member to just above the front terminus of the first frame member. The fourth frame member 23 is connected near the top of the second frame member and extends rearward, arches downward, and connects to the rear terminus of the first frame member. The fifth frame member 24 is vertically oriented and connects the front termini of the first and third frame members. The fifth frame member also functions as the main structural component of the steering column.

FIG. 2 shows a rear view of the orthopedic scooter configured for an occupant with a compromised right leg. FIG. 3 shows a rear view of the scooter configured for a compromised left leg. Refer now to FIG. 2. A horizontal rod 26 connects the swiveling secondary front wheel fork 19 to the front of the scooter frame just above the primary front wheel fork 17. Padded leg rest 12 is mounted to rod 26 using a bracket 27 that is mounted to the backside of the padded leg rest. The angular position of the padded leg rest is fixed at a continuum of possible angles by clamps 28a and 28b. Screws 29a and 29b hold the padded leg rest to the bracket 27. The height of the padded leg rest can be adjusted by using threaded ports spaced incrementally on the back side of the leg rest. The padded seat 11 is mounted to horizontal rods 30a and 30b that allow the seat to be horizontally positioned forward or rearward by sliding the seat along the rods. Clamps (not shown) are used to lock the seat into the desired position. The vertical height of the seat is adjusted by sliding the seat post 25 up or down and locking into place using clamp 31. The rear axle 15 is attached to the scooter frame by clamp 32. When the clamp is released, the axle can slide horizontally to the right side or left side of the scooter depending upon which leg of the occupant is compromised and requires support. The clamp 32 is also a pivot point for the axle so that it can be folded inward to collapse (see FIG. 5) the scooter for storage.

Handles 33a and 33b, with padded grips, are used to steer the scooter by controlling the direction of the primary front wheel 16. Brake levers 34a and 34b are mounted to the handles and control brake calipers 35a and 35b that are mounted to the rear wheels. A flexible cable system 36 is used to activate the brake calipers when the handles are squeezed, allowing the occupant to slow or stop the scooter. Wheel locks 37a and 37b are also included and function independently from the braking system. The wheel locks can be engaged to prevent the scooter from moving while the occupant is mounting or dismounting the scooter.

Referring to FIG. 4, showing a frontal view of the scooter, the handles 33a and 33b are mounted to a pair of concentric, telescopically adjustable tubes 38 and 39, which enable the height of the handle to be fixed at a desired position. Clamps 40 and 41 are used to lock the position of the telescopic tubes. The bottom of the lower tube 39 fits through the fifth frame member 24 (see also FIG. 1) and is attached to the top of front fork 17. The tube 39 can rotate freely within the fifth frame member to allow steering of the front primary wheel 16. The horizontal rod 26 connects the secondary front wheel 18 to the scooter frame and is locked into position by a bracket 42 that contains two clamps 43a and 43b. Release of the clamps allows the front rod to be moved from one side of the scooter to the other depending upon which leg requires support. The bracket 42 contains a fused collar that fits around the fifth frame member 24 and is able to rotate about the fifth frame member. This enables the horizontal rod to fold backward into a collapsed position (see FIG. 5) for storage of the scooter. A clamp (not shown) locks the bracket into either a collapsed or un-collapsed position.

Referring to FIG. 5, the scooter is shown in a collapsed configuration for storage. To collapse the scooter, the bracket 42 is unclamped. This bracket is fused with a collar fitting around the outside of the fifth frame member 24 and enables the front horizontal rod 26 to rotate backwards about the axis of the steering column. The padded leg rest 12 moves rearward since it is attached to the horizontal rod. The heal rest 13 can flip upward. The rear axle 15 can rotate forward about a pivot point located on clamp 32. The steering column collapses by releasing clamps 40 and 41 and sliding the two concentric tubes 38 and 39 downward. In the collapsed configuration the scooter can be stowed in the trunk or back seat of a car, or stored in a closet.

FIG. 6 shows a side view of the scooter with optional features. A back rest 43 can be mounted to the seat post 25. A curved extension bar 44 is used to attach the back rest to the scooter. A threaded knob 45 secures the back rest to the extension bar. The vertical position of the back rest is adjustable by releasing a clamp 46 that is used to attach the extension bar to the seat post 25. Optional folding crutches 47 can be secured to the scooter by brackets 48*a* and 48*b*. Crutches may be necessary when encountering obstacles like a flight of stairs. The scooter occupant will need to unfold the crutches and dismount the scooter. An assistant will carry the lightweight scooter up or down the flight of stairs while the person with the compromised leg uses the crutches. It is an object of the scooter to provide a means for a person with a compromised leg to transport themselves to the various places required for modern living. Toward this end, there will be instances where crutches may be needed. By conveniently storing crutches on the scooter, the occupant can transport themselves to a greater variety of places.

The description above is considered illustrative of only the principles of the invention. To those skilled in the art, numerous modifications will be obvious to conceive. It is therefore not the intent of this patent to limit the scope of the invention to only the exact description included here. All reasonable or obvious modifications and extensions are within the scope of the invention.

What is claimed is:

1. An asymmetrical mobility scooter that can be configured in a first position to accommodate an occupant with an injured right leg or foot, or in a second position to accommodate an occupant with an injured left leg or foot, comprising:

a primary front wheel, and two rear wheels;

a frame supported by the primary front wheel and the two rear wheels;

a sliding rear axle coupled perpendicularly to the rear of said frame that can be configured in a first position wherein the majority of the axle extends to the right side of said frame, or a second position wherein the majority of the axle extends to the left side of said frame, and the sliding rear axle is locked into position using a clamp;

a horizontal stabilizing rod with coupling bracket for attaching an L-shaped leg and heal rest, wherein the horizontal stabilizing rod is coupled perpendicularly to the front of said frame and can be configured in a first position extending entirely to the right side of said frame, or a second position extending entirely to the left side of said frame, and said horizontal stabilizing rod is locked into position using a clamp;

a secondary front swivel caster wheel coupled to said horizontal stabilizing rod at the end opposite said frame;

a seat to support the weight of an occupant;

a handle bar and steering column.

2. The scooter of claim 1 wherein said frame is comprised of a plurality of structural members that can include a longitudinal member that extends from the rear of the scooter to the front of the scooter in an upwardly arching manner, a central vertical member perpendicular to and extending vertically upward from the longitudinal member, an upper rear curved member connected near the top of the central vertical member extending rearward and curved downward to connect to the rear portion of the longitudinal member, an upper front member connected at one end near the top of the central vertical member and at the opposite end connected to the front portion of the longitudinal member, and a front member positioned vertically that connects at one end to the front of the longitudinal member and at the other end to the front of the upper front member.

3. The scooter of claim 1 wherein said handle bar and steering column are coupled through said front member of the frame to a fork on which said front wheel is mounted, and said handle bar is telescopically height adjustable.

4. The scooter of claim 1 wherein said L-shaped leg and heal rest is attached to said coupling bracket that is coupled to said horizontal stabilizing rod by means of a clamp that rotates around said horizontal stabilizing rod, and the clamp is used to lock said L-shaped leg and heal rest into position at various angles, and said L-shaped leg and heal rest is height adjustable by means of bracket attachment screws and threaded ports spaced incrementally and located on the backside of said L-shaped leg and heal rest.

\* \* \* \* \*